United States Patent [19]

Wen

[11] Patent Number: 4,835,625
[45] Date of Patent: May 30, 1989

[54] METHOD OF RECORDING TIMING DATA GENERATED BY A CENTRAL PROCESSING UNIT ONTO A TAPE FOR DIGITAL DISPLAY

[75] Inventor: Sayling Wen, Taipei City, Taiwan

[73] Assignee: Inventa Electronics Co., Ltd., Taipei City, Taiwan

[21] Appl. No.: 83,521

[22] Filed: Aug. 7, 1987

[51] Int. Cl.$^4$ ............................................. G11B 27/38
[52] U.S. Cl. ............................................ 360/6; 360/4
[58] Field of Search .................. 360/72.2, 4, 27, 137, 360/6; 352/171; 116/DIG. 14

[56] References Cited

U.S. PATENT DOCUMENTS

| | | | |
|---|---|---|---|
| 4,500,753 | 2/1985 | Plunkett, Jr. | 379/70 |
| 4,536,804 | 8/1985 | Kasabachi et al. | 360/4 |
| 4,574,319 | 3/1986 | Konishi | 358/335 |
| 4,663,678 | 5/1987 | Blum | 360/27 |

Primary Examiner—Aristotelis M. Psitos
Assistant Examiner—Kevin J. Fournier
Attorney, Agent, or Firm—Ladas & Parry

[57] ABSTRACT

An improved cassette tape recorder is provided for storing the time message, generated by the real time clock of the central processing unit, into a tape region between a first record and a second record immediately behind the time message so that it can be digitally displayed everytime it is necessary. The time message includes time data of year, month, day, week, hour, minute and second, etc.

1 Claim, 5 Drawing Sheets

|   | timing digital signal | | | | DTMF multi frequency | | symbol in this preferred embodiment |
|---|---|---|---|---|---|---|---|
|   | $D_3$ | $D_2$ | $D_1$ | $D_0$ | low fre.(Hz) | high fre.(Hz) |   |
| 1 | 0 | 0 | 0 | 1 | 697 | 1209 | 1 |
| 2 | 0 | 0 | 1 | 0 | 697 | 1336 | 2 |
| 3 | 0 | 0 | 1 | 1 | 697 | 1477 | 3 |
| 4 | 0 | 1 | 0 | 0 | 770 | 1209 | 4 |
| 5 | 0 | 1 | 0 | 1 | 770 | 1336 | 5 |
| 6 | 0 | 1 | 1 | 0 | 770 | 1477 | 6 |
| 7 | 0 | 1 | 1 | 1 | 852 | 1209 | 7 |
| 8 | 1 | 0 | 0 | 0 | 852 | 1336 | 8 |
| 9 | 1 | 0 | 0 | 1 | 852 | 1477 | 9 |
| 0 | 1 | 0 | 1 | 0 | 941 | 1209 | 0 |
| * | 1 | 0 | 1 | 1 | 941 | 1336 | start signal |
| # | 1 | 1 | 0 | 0 | 941 | 1477 | stop signal |
| A | 1 | 1 | 0 | 1 | 697 | 1633 | invalid word |
| B | 1 | 1 | 1 | 0 | 770 | 1633 | reserved |
| C | 1 | 1 | 1 | 1 | 852 | 1633 | reserved |
| D | 0 | 0 | 0 | 0 | 941 | 1633 | reserved |

FIG. 4

METHOD OF RECORDING TIMING DATA GENERATED BY A CENTRAL PROCESSING UNIT ONTO A TAPE FOR DIGITAL DISPLAY

BACKGROUND OF THE INVENTION

This invention relates to a method of recording timing data generated by a central processing unit onto a tape and of displaying it digitally.

There is believed to be a substantial need for large numbers of people to use a device such as a recorder which is capable of recording timing data when it is necessary. The application of the device in the form of a "picture" has been solved by using a camera with a timer, and the problem of recording the same in the form of "sound" has never been a major concern. Therefore, it will be appreciated that the invention of such a device which records and digitally displays the time immediately upon request introduces a new improvement since no prior art devices appear to fit this description.

SUMMARY OF THE INVENTION

The object of this invention is to provide a method of recording data from signals generated by a real time clock of the central processing unit (CPU) onto a tape and then display it readily.

BRIEF DESCRIPTION OF THE DRAWINGS

The invention will to be described in greater detail, by way of embodiment, with reference to the accompanying drawings, in which:

FIG. 4 is a table illustrating a definition of dual-tone multifrequency according to this invention.

FIGS. 5a, 5b, 5c and 5d illustrate the dual-tone multifrequency stored into a tape in a train of pulses which is synchronous with the timing digital signals.

DETAILED DESCRIPTION OF THE INVENTION

Figure 1:
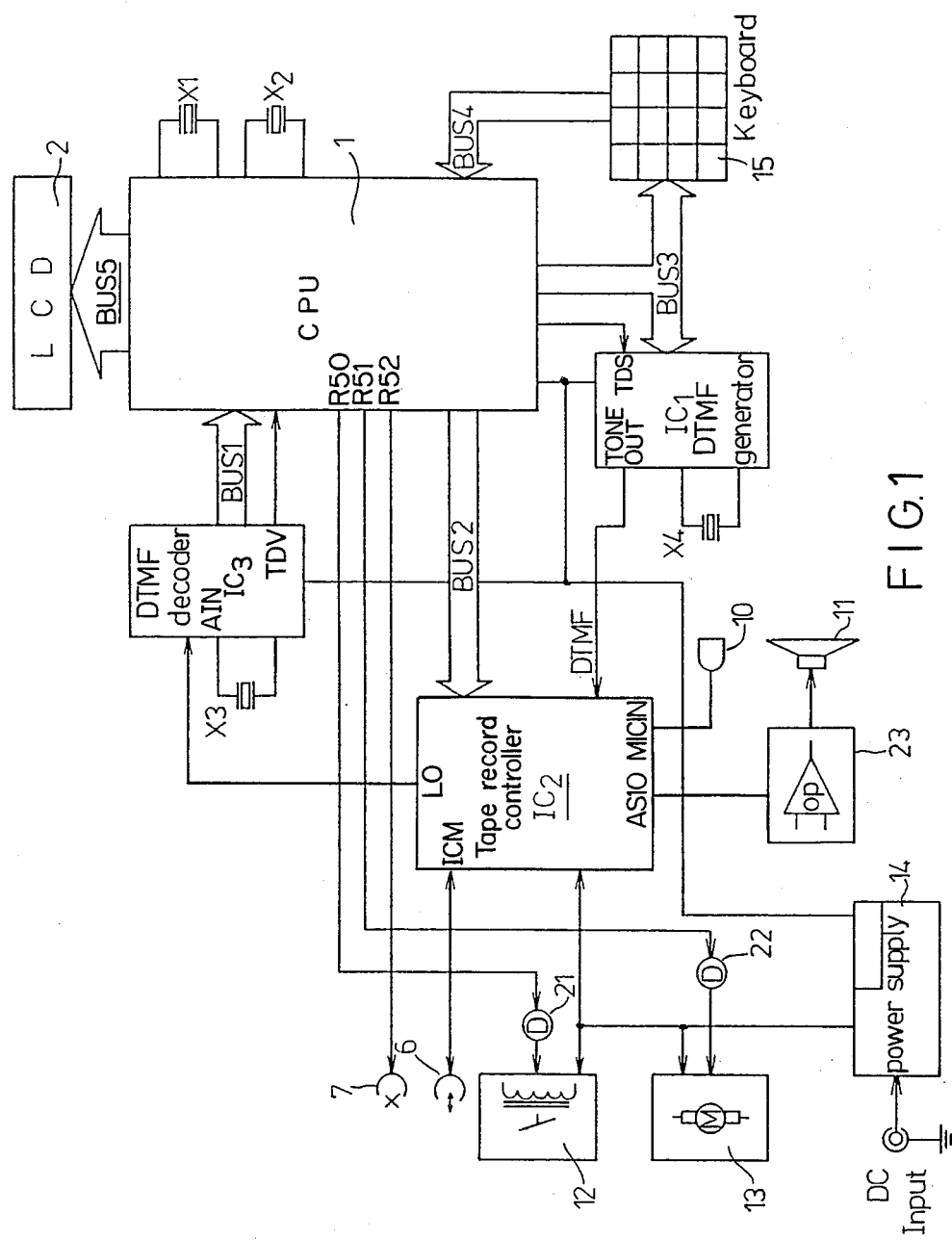
FIG. 1 is a block diagram illustrating the cassette recorder of basic forms of this invention.

The simplified block diagram of FIG. 1 illustrates the interconnections among all major components required for effecting the operation of this invention, comprising: a central processing unit 1 (CPU) having a read only memory (ROM), a random access momery (RAM) and real time clock thereof; two oscillators X1 and X2 having a center frequency of 32.768 kHz and 1 Mega Hz, respectively connected to the CPU 1 for providing an oscillating signal to the CPU1, thereby ensuring that time and operation frequency are synchronous with the oscillating signal developed by X1 and X2; a liquid crystal display 2 (LCD) coupled to the CPU via bus 5; a keyboard 15, having a plurality of special function keys thereon, connected to the CPU via buses 3 and 4; a tape record controller IC2 (such as the LA2800 manufactured by Sanyo Japan) coupled to the CPU via bus 2; a dual-tone mutlifrequency (DTMF) generator IC1 (such as the TP5088 manufactured by Sharp Japan) with an oscillator X4 having a center frequency of 3.58 kHz thereon, respectively connected to the CPU 1 and the DTMF generator IC1 via bus 3, leads $\overline{TDS}$ and TONE OUT; a DTMF decoder IC3 (such as the LR4101 manufactured by Sharp Japan) with an oscillator X3 having a center frequency of 3.58 kHz thereon, and interconnected with the CPU 1 and the tape record controller IC2 via bus 1, leads TDV and LO; a tape erase head 7 coupled to the CPU 1 via lead R52; a tape read/write (R/W) head 6 connected to the tape record controller IC2 via lead ICM; a microphone 10 coupled to the tape record controller IC2 via lead MICIN; a relay 12 connected through a current driver 21 to the CPU 1 via lead R50; a direct current (DC) motor 13 coupled through the current driver 22 to the CPU 1 via lead R51; a speaker 11 connected through an amplifier 23 to the CPU 1 via lead AS10; a power supply whose two different voltages respectively supplied either to the DC motor 13, the relay 12 and the tape record controller IC2, or to the DTMF decoder IC3, DTMF generator IC1 and CPU 1.

Figure 2:
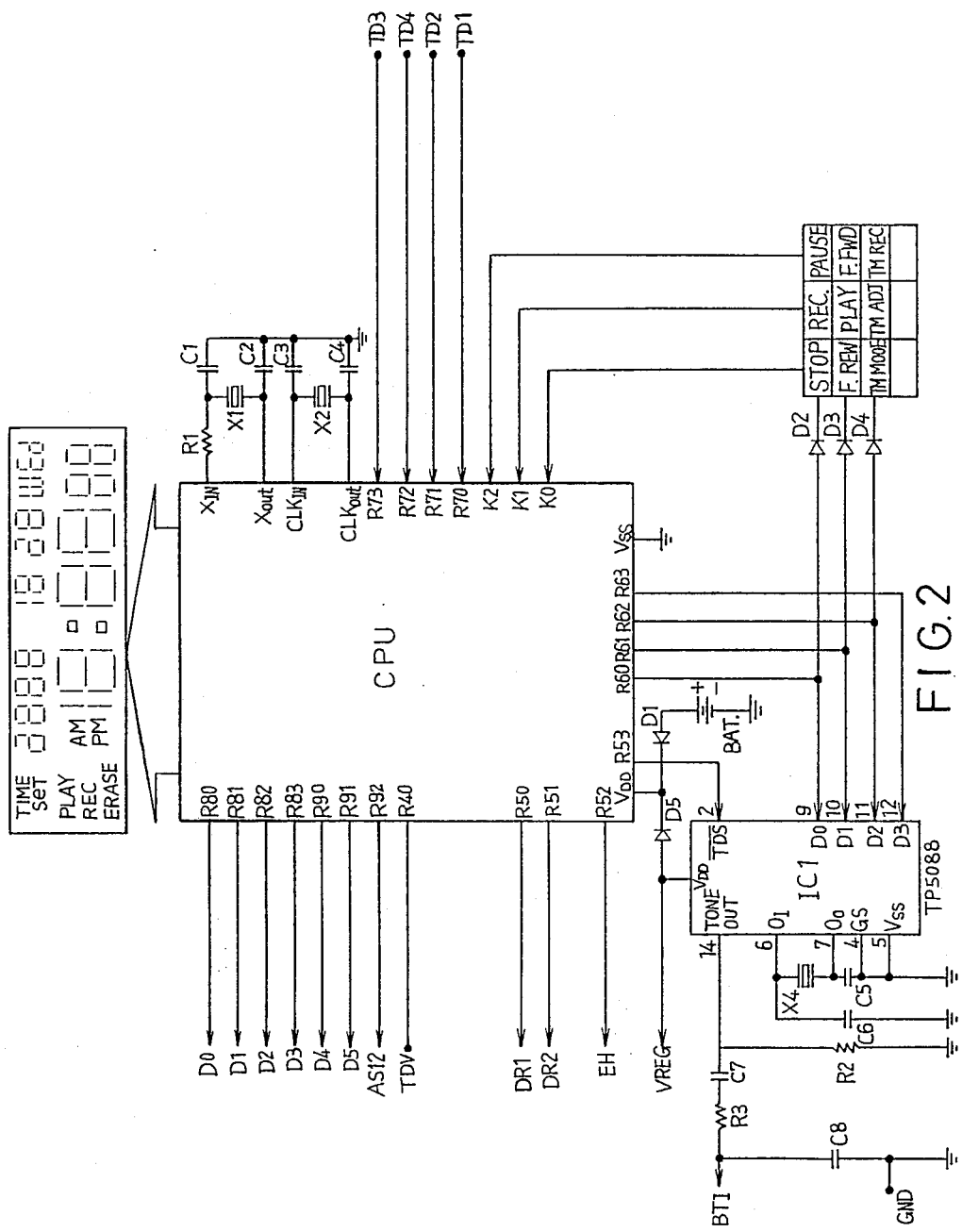
FIGS. 2 and 3 together show schematic circuit diagrams of a preferred embodiment within this invention.
Figure 3:
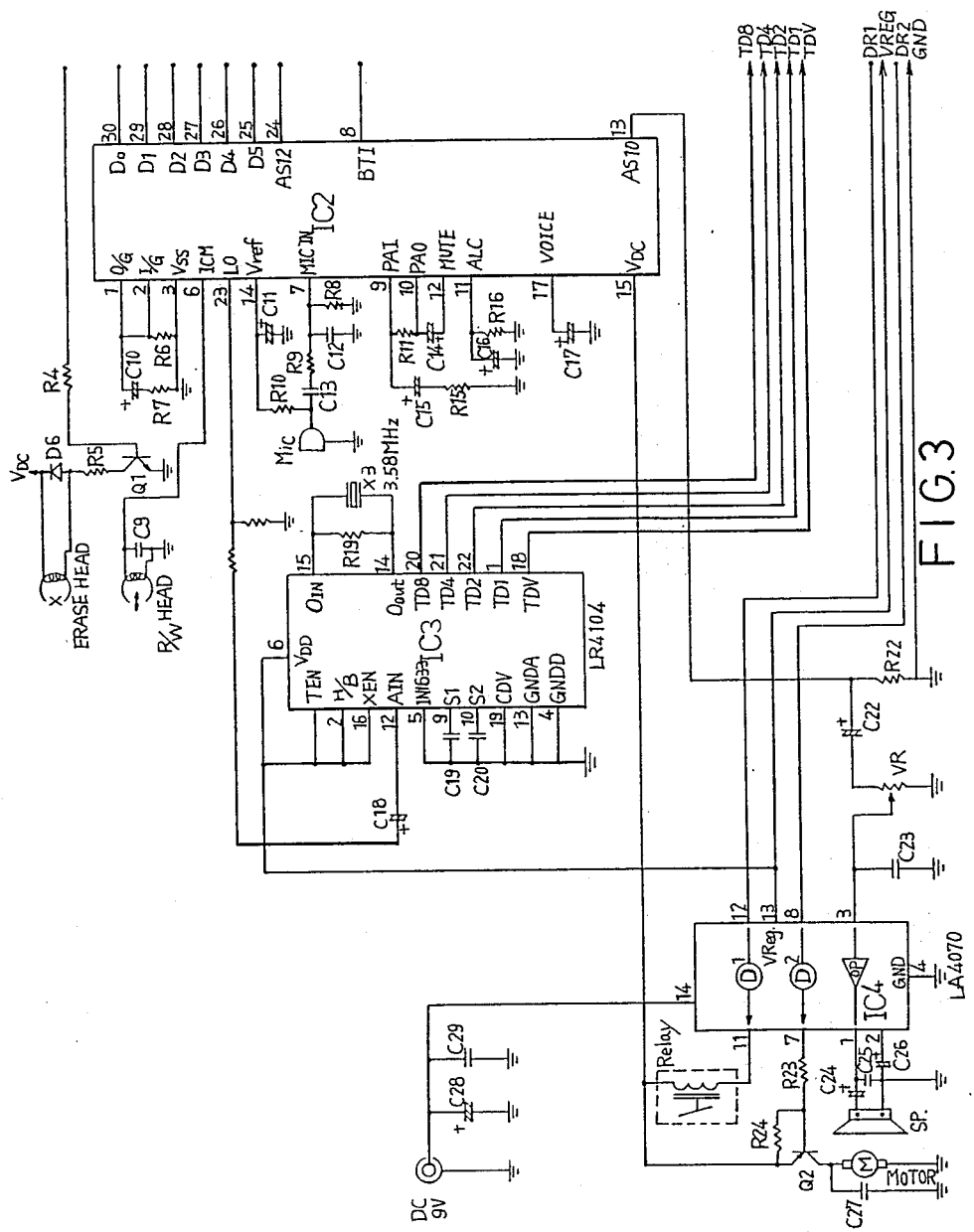

With further reference to FIGS. 2 and 3, the output leads R80-R92 of the CPU 1 are connected to the input leads D0-AS12 of the tape record controller IC2 via bus 2. The output leads R60-R63 of the CPU 1 are coupled to the input leads D0-D3 of the DTMF generator IC1 via bus 3. A battery having positive potential and negative potential is respectively coupled to lead VDD of the CPU 1 and ground. A keyboard 15 is interconnected with the output leads R60-R63 of the CPU 1 and the input leads K0-K2 thereof so as to designate the control signals and to reset the timing data, and a LCD receiving the timing digital signals from the CPU 1 is connected thereto via bus 5. Accordingly, the control signals developed by the CPU 1 are sent to the tape record controller IC2 via bus 2 under the record mode. Simultaneously, the timing digital signals output from the output leads R60-R63 are supplied to the DTMF generator IC1 via bus 3. The timing digital signals are converted through digital-to-analog conversion into the timing analog signals (DTMF) via the DTMF generator IC1, and then input to the lead BTI of the tape record controller IC2. The timing analog signals from the lead ICM of the tape record controller IC2 are sent to the read/write head. The signals from leads R50 and R51 of the CPU 1 are respectively supplied to the relay 12 and DC motor 13 so that the cassette operated by the DC motor 13 can stored the timing analog signals thereinto via tape R/W head 6.

Responsive to the timing analog signals which are stored and prearranged in sequence into the cassette, a further more detailed description will be provided hereinafter.

When the cassette recorder is set at the play mode, the timing analog signals stored into the casette are first received by the tape R/W head 6 and then sent to the tape record controller IC2 via lead ICM, followed by the audio signals. Accordingly, the timing analog signals are applied, through resistors R17 and R18 as well as capacitor C18 on lead LO, to the DTMF decoder IC3. The timing analog signals are also sent to the speaker 11 via amplifier 23. The timing analog signals are converted through analog-to-digital conversion into the timing digital signals via the DTMF decoder IC3 and then supplied to the CPU 1 via bus 1 so that they can be checked via CPU 1 as to whether or not the timing data is correct, thereby permitting timing digital signals to be digitally displayed on the LCD.

In FIG. 4, a table illustrated a definition of the dual-tone multifrequency and the timing digital signal within this invention is shown thereon. The timing digital signals from the bus 3 of the CPU 1 are converted, through digital-to-analog conversion, into two groups of differential multifrequencies in the preferred embodiment. In this table, 0-9 are used in the conventional manner; B, C and D are all reserved words; A is an invalid word; * is designated as the start signal, which prevents the timing analog signals from signal errors caused by receiving the timing analog signals therebetween; and # is designated as the stop signal for ending the timing analog signals.

Figure 5:
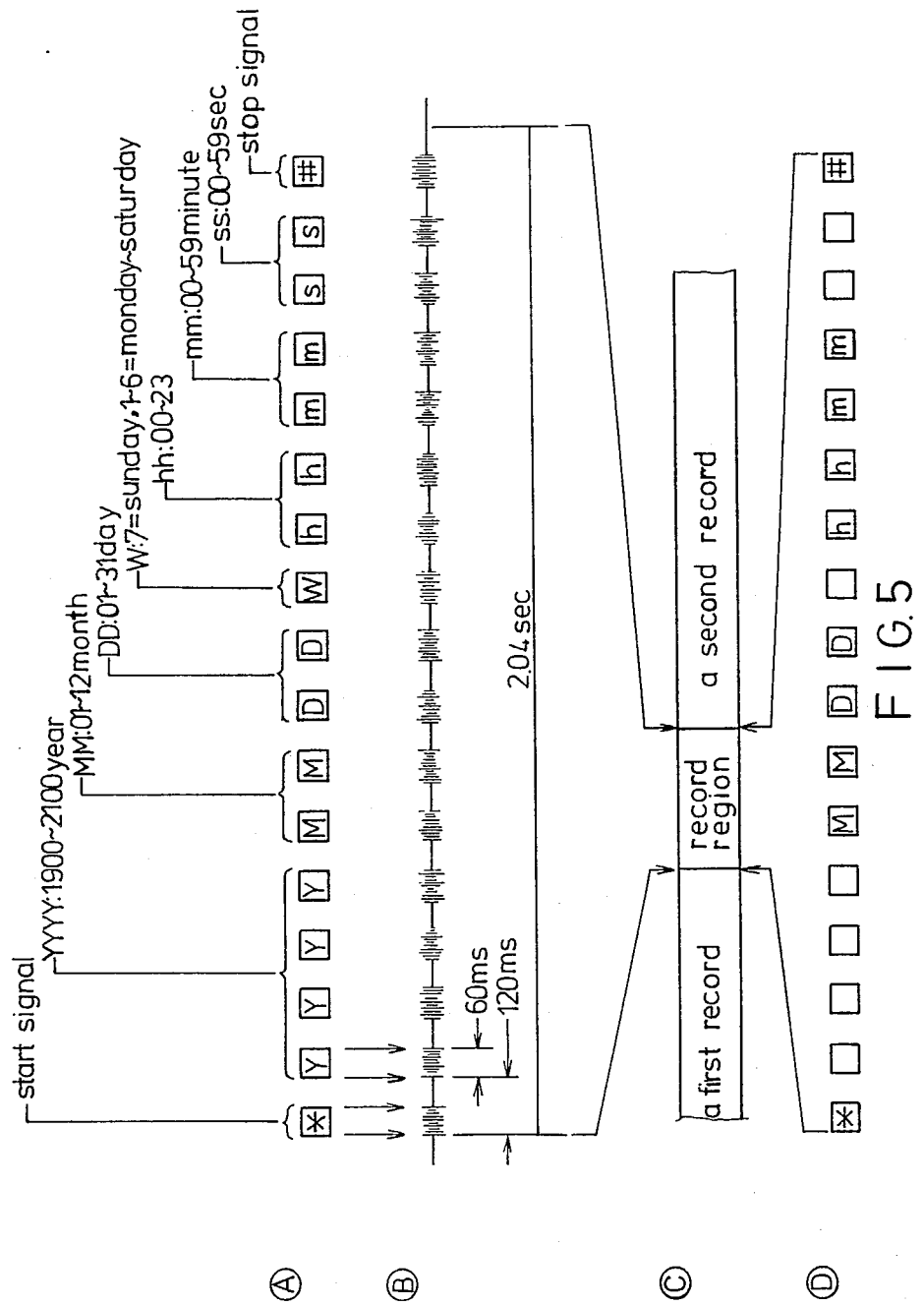
FIG. 5 is a schematic view showing the relationship between FIGS. 5a, 5b, 5c and 5d.

The relationship between the timing digital signals, the timing analog signals (DTMF) stored into the cassette, and the sequence of the DTMF, is described in more detail in FIG. 5.

The timing signals developed by the real time clock of the CPU 1, which is prearranged in sequence, is shown in FIG. 5a.

The timing digital signals from the CPU 1, through bus 3, to the DTMF generator IC1 are formatted as shown in FIG. 5a. The format may include start signal, timing digital signals (typically including year, month, day, week, hour, minute and second, etc.) and stop signal in a prearranging sequence.

The DTMF as shown in FIG. 5b, being synchronous with the timing digital signals shown in FIG. 5a, is developed from the DTMF generator IC1. The duration of each signal is approximately 60 ms. The gap separating each signal is approximately 60 ms. The total duration of the timing digital signals is approximately 2.04 seconds.

The timing analog signals shown in FIG. 5b are stored into the tape region between a first record and a second record immediately behind the timing analog signals via the tape record controller IC2 and the tape read/write head 6, as shown in FIG. 5c, during recording.

In FIG. 5d, the timing analog signals serve as a selective mode, including start signal, month data, day data, hour data and minute data only. The remainder of the timing signals are then filled with the invalid word "A".

The special function keys of the keyboard 15 are described below.

PLAY key functions to reproduce a tape recording.
REC key functions to record, but both the REC key and the PLAY key must be depressed in order to prevent accidental misuse.

PAUSE key functions to enable the tape recorder to temporarily stop the movement of the tape without switching the recorder from the "PLAY" or "REC" key.

F.FWD key functions to permit tape to be run rapidly through the recorder in the forward direction.

F.REW key functions in the same way as the F.FWD key, but in the backward direction.

TM MODE key functions to effect both timing and reset. The content of the timing data can be selectively set by the procedure of year, month, day, week, hour, minute, second, and after reaching the normal record mode the setting procedure returns to year.

TM ADJ key functions to adjust the content of the timing data increasingly, but the second data is changed to zero during adjustment.

TM REC key functions to record, except for the recording of the timing data.

STOP key functions to stop all actions when the cassette tape recorder is in the play, record, fast-forward and fast-rewind mode.

A typical sequence of operation is as follows.

Under the record mode, both the play and record keys are depressed. After conditioning, data bits are sent during the course of a sequential scan by bus 3 of the CPU 1 and then sent thereto by bus 4. These bits control the relay 12 and the DC motor 13 via leads R50 and R51 of the CPU 1. The timing signals from the CPU 1, having start signal and stop signal thereof, are converted into DTMF via the DTMF generator IC1. The tape record controller IC2 is enabled by the control signals from the leads R80-R92 of the CPU 1 via bus 2 to receive the DTMF, thereby activating the tape read/write head 6 to store the DTMF into the cassette and then store the desired audio signals thereinto. The DTMF generator IC1 is disenabled by the signals from the lead R53 of the CPU 1 after the record of the DTMF has ended. The signals from leads R80-R90 of the CPU 1 are sent to the tape record controller IC2 to switch the connection between leads 8 and 6 thereof into the connection between leads 7 and 6 thereof, thus the cassette recorder is in the normal record mode.

If the cassette recorder is in the play mode, the signals from the leads R50 and R51 of the CPU 1 activate the relay 12 and the DC motor 13. At this time, the tape erase head is disenabled by the signal from the lead R52 of the CPU 1. The timing analog signals (DTMF) are received by the tape read/write head 6 and sent to the tape record controller IC2, and thereafter are either applied to the speaker 11 via the amplifier 23, or sent through the DTMF decoder IC3 to the CPU 1 via analog-to-digital conversion so that the timing digital signals can be checked in the CPU 1. As the timing digital signals are received by the CPU 1, they are checked therein as to whether or not the proper start signal, timing digital signals and stop signal thereof are present. If any of the timing digital signals are incorrect or the record is not completed in a predetermined time (approximately 4 seconds), the timing digital signals are considered as being incorrect.

As will be understood by those familiar with the art, the present invention may be embodied in other specific forms without departing from the spirit or essential characteristics thereof. Alternatively, the disclosure of the preferred embodiments of the present invention is intended to be illustrative, but not limiting, of the scope of the invention which is set forth in the following claims.

What is claimed is:

1. In a method of recording a timing data comprising the steps of:

loading a timing data generated by a central processing means into a DTMF generating means;

translating said timing data for providing a translated timing data;

loading said translated timing data from said DTMF generating means into a tape recording controller means;

storing said translated timing data into a tape provided in said tape recording controller means;

transmitting said translated timing data from said tape into a DTMF decoding means via said tape recording controller means; and transmitting said translated timing data to said central processing means for displaying said timing data digitally;

the improvement characterized in that said step of loading a timing data is a step of loading a combination of a start signal, timing signals and a stop signal, said combination being immediately ahead of an audio signal.

* * * * *